United States Patent
Okumura

(10) Patent No.: US 11,503,006 B2
(45) Date of Patent: Nov. 15, 2022

(54) COMPUTER-READABLE MEDIUM, INFORMATION PROCESSING DEVICE, AND METHOD FOR PROVIDING BETTER ACCESSIBILITY TO CLOUD SERVER

(71) Applicant: BROTHER KOGYO KABUSHIKI KAISHA, Nagoya (JP)

(72) Inventor: Fumio Okumura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 305 days.

(21) Appl. No.: 16/750,065

(22) Filed: Jan. 23, 2020

(65) Prior Publication Data

US 2020/0287883 A1    Sep. 10, 2020

(30) Foreign Application Priority Data

Mar. 5, 2019  (JP) .............................. JP2019-039729

(51) Int. Cl.
*H04L 9/40* (2022.01)
*G06Q 10/10* (2012.01)
(Continued)

(52) U.S. Cl.
CPC ............. *H04L 63/08* (2013.01); *G06Q 10/10* (2013.01); *H04N 1/4426* (2013.01); *H04N 1/4433* (2013.01); *H04L 67/10* (2013.01)

(58) Field of Classification Search
None
See application file for complete search history.

(56) References Cited

U.S. PATENT DOCUMENTS 8,528,071 B1    9/2013  Kwan
9,319,549 B2 *  4/2016  Kimura .............. H04N 1/00244
(Continued)

FOREIGN PATENT DOCUMENTS

JP    2014-045461 A    3/2014

OTHER PUBLICATIONS

Official Action dated Nov. 18, 2021 from related application U.S. Appl. No. 16/749,206, filed Jan. 22, 2020.
(Continued)

*Primary Examiner* — Kaveh Abrishamkar
(74) *Attorney, Agent, or Firm* — Scully, Scott, Murphy & Presser, PC

(57) ABSTRACT

A non-transitory computer-readable medium stores computer-readable instructions executable by a processor of an information processing device communicably connected with an image processing apparatus and a cloud server. The computer-readable instructions realize an application configured to, when executed by the processor, cause the processor to perform, in response to receiving an import instruction to import a workflow, reading, from an export file, workflow information representing the workflow that is a sequence of processes using the image processing apparatus and the cloud server, and selecting one of a plurality of methods to obtain authentication information for accessing the cloud server to perform the workflow represented by the read workflow information, and access, in response to receiving a workflow execution instruction to perform the workflow, the cloud server by using the authentication information obtained in the selected method.

15 Claims, 12 Drawing Sheets

(51) Int. Cl.
*H04N 1/44* (2006.01)
*H04L 67/10* (2022.01)

(56) References Cited

U.S. PATENT DOCUMENTS

| | | | |
|---|---|---|---|
| 9,774,586 B1* | 9/2017 | Roche | H04L 63/08 |
| 10,009,337 B1* | 6/2018 | Fischer | H04L 67/1097 |
| 10,044,723 B1* | 8/2018 | Fischer | H04L 63/102 |
| 10,057,246 B1* | 8/2018 | Drozd | G06F 21/335 |
| 11,140,163 B2 | 10/2021 | Borkar et al. | |
| 11,222,109 B2* | 1/2022 | Okumura | H04L 41/22 |
| 2002/0087894 A1 | 7/2002 | Foley et al. | |
| 2007/0199059 A1 | 8/2007 | Takehi | |
| 2008/0033956 A1 | 2/2008 | Saha et al. | |
| 2008/0046521 A1 | 2/2008 | Yanagi et al. | |
| 2009/0006996 A1 | 1/2009 | Saha et al. | |
| 2011/0228311 A1 | 9/2011 | Oguma et al. | |
| 2013/0036459 A1 | 2/2013 | Liberman et al. | |
| 2014/0289833 A1 | 9/2014 | Briceno et al. | |
| 2014/0380462 A1* | 12/2014 | Hosoda | G06F 21/31 726/17 |
| 2015/0178029 A1 | 6/2015 | Miyazawa | |
| 2015/0181060 A1 | 6/2015 | Miyazawa | |
| 2015/0181061 A1 | 6/2015 | Miyazawa | |
| 2015/0261972 A1 | 9/2015 | Lee | |
| 2018/0098184 A1 | 4/2018 | Tsuji et al. | |
| 2018/0181352 A1 | 6/2018 | Saito | |
| 2018/0262496 A1 | 9/2018 | Namboodir et al. | |
| 2018/0285544 A1 | 10/2018 | Chang et al. | |
| 2018/0367699 A1 | 12/2018 | Sato | |
| 2019/0156342 A1 | 5/2019 | Xia et al. | |
| 2019/0222570 A1 | 7/2019 | Krishan | |
| 2019/0222576 A1 | 7/2019 | Borkar et al. | |
| 2019/0286811 A1* | 9/2019 | Okumura | G06F 21/45 |
| 2020/0287883 A1 | 9/2020 | Okumura | |

OTHER PUBLICATIONS

Official Action dated Feb. 24, 2022 from related application U.S. Appl. No. 16/749,206, filed Jan. 22, 2020.

* cited by examiner

FIG. 2

| NAME | SCAN SETTINGS | STORAGE SETTINGS | | |
|---|---|---|---|---|
| | | STORAGE DESTINATION | STORAGE LOCATION | USE TOKEN |
| Scan-Up A | Image Scanner A High Resolution Color | Cloud Server | Service A | Default |
| Scan-to-PC | Image Scanner A Low Resolution Color | PC | Folder A | — |
| Scan-Up B | Image Scanner A High Resolution Monochrome | Cloud Server | Service B | Specific |
| Scan-Up C | Image Scanner A Low Resolution Monochrome | Cloud Server | Service B | Specific |

COMPUTER-READABLE MEDIUM, INFORMATION PROCESSING DEVICE, AND METHOD FOR PROVIDING BETTER ACCESSIBILITY TO CLOUD SERVER

CROSS-REFERENCE TO RELATED APPLICATION

This application claims priority under 35 U.S.C. § 119 from Japanese Patent Application No. 2019-039729 filed on Mar. 5, 2019. The entire subject matter of the application is incorporated herein by reference.

BACKGROUND

Technical Field

Aspects of the present disclosure are related to a non-transitory computer-readable medium, an information processing device, and a method for providing better accessibility to a cloud server.

Related Art

In recent years, technologies for uploading and downloading data between a cloud server and an information processing device (e.g., a PC and a smartphone) have been known. For instance, a technology for uploading data scanned by an image scanner to a cloud server has been disclosed.

SUMMARY

In general, a cloud server needs to be accessed using authentication information provided by the cloud server. The above disclosed technology does not suggest any details about obtaining or using authentication information. Thus, there is room for improvement in technologies for obtaining and using authentication information to access a cloud server.

Aspects of the present disclosure are advantageous to provide one or more improved techniques for providing better accessibility to a cloud server from an information processing device.

According to aspects of the present disclosure, a non-transitory computer-readable medium is provided, which stores computer-readable instructions executable by a processor of an information processing device communicably connected with an image processing apparatus and a cloud server. The computer-readable instructions realize an application configured to, when executed by the processor, cause the processor to perform, in response to receiving an import instruction to import a workflow, reading, from an export file, workflow information representing the workflow that is a sequence of processes using the image processing apparatus and the cloud server, and selecting one of a plurality of methods to obtain authentication information for accessing the cloud server to perform the workflow represented by the read workflow information, and access, in response to receiving a workflow execution instruction to perform the workflow, the cloud server by using the authentication information obtained in the selected method.

According to aspects of the present disclosure, further provided is an information processing device that includes one or more communication interfaces configured to communicate with an image processing apparatus and a cloud server, and a controller configured to perform, in response to receiving an import instruction to import a workflow, reading, from an export file, workflow information representing the workflow that is a sequence of processes using the image processing apparatus and the cloud server, and selecting one of a plurality of methods to obtain authentication information for accessing the cloud server to perform the workflow represented by the read workflow information, and access, in response to receiving a workflow execution instruction to perform the workflow, the cloud server by using the authentication information obtained in the selected method.

According to aspects of the present disclosure, further provided is a method implementable on a processor of an information processing device communicably connected with an image processing apparatus and a cloud server. The method includes performing, in response to receiving an import instruction to import a workflow, reading, from an export file, workflow information representing the workflow that is a sequence of processes using the image processing apparatus and the cloud server, and selecting one of a plurality of methods to obtain authentication information for accessing the cloud server to perform the workflow represented by the read workflow information, and accessing, in response to receiving a workflow execution instruction to perform the workflow, the cloud server by using the authentication information obtained in the selected method.

BRIEF DESCRIPTION OF THE ACCOMPANYING DRAWINGS

FIG. 2 shows an example of a workflow table in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
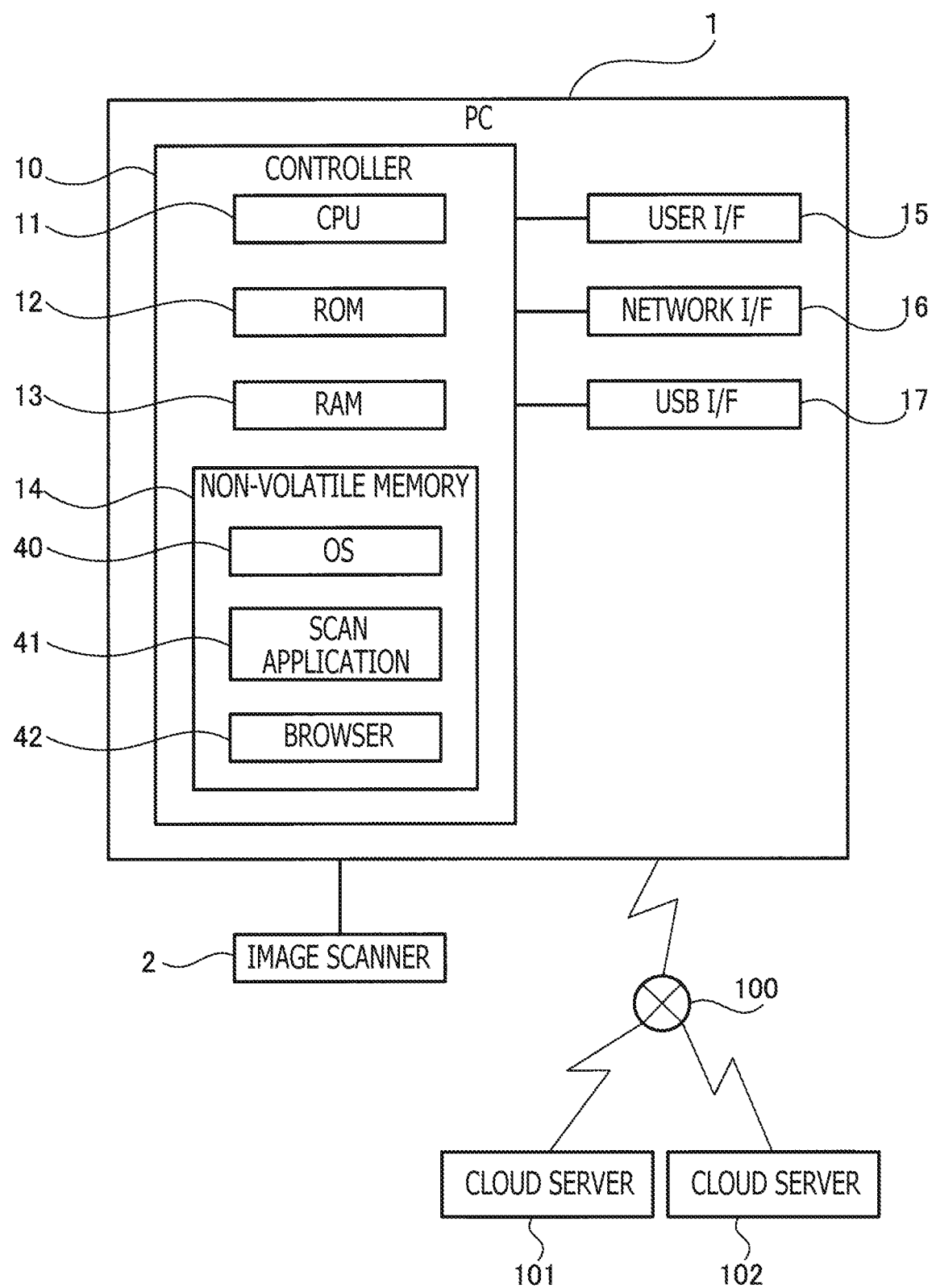
FIG. 1 is a block diagram schematically showing an electrical configuration of a PC in an illustrative embodiment according to one or more aspects of the present disclosure.

As shown in FIG. 1, a PC 1 of the illustrative embodiment is connected with an image scanner 2 and an Internet 100 and configured to execute various programs by using the image scanner 2 or the Internet 100. The PC 1 may be an example of an "information processing device" according to aspects of the present disclosure. In this regard, it is noted that examples of the "information processing device" may include, but are not limited to, tablet computers and smartphones as well as PCs.

The image scanner 2 is configured to scan images of a document, generate image data of the scanned images, and transmit the generated image data to the PC 1. The image scanner 2 may be an example of an "image processing apparatus" according to aspects of the present disclosure. It is noted that, in the illustrative embodiment, one or more image scanners 2 may be connected with the PC 1. Further, examples of the "image processing apparatus" connectable with the PC 1 may include, but are not limited to, copy machines, multi-function peripherals, fax machines, and digital cameras, as well as image scanners. Namely, any apparatuses or devices configured to obtain image data and transmit the obtained image data to the PC 1 may be connected with the PC 1.

The PC 1 has a function to receive image data from the image scanner 2 and a function to access cloud servers. For instance, as shown in FIG. 1, the PC 1 is connected with cloud servers 101 and 102 via the Internet 100. FIG. 1 shows an example in which the PC 1 is connected with the two cloud servers 101 and 102. Nonetheless, the PC 1 may be connected with three or more cloud servers.

A user of the PC 1 may use, via the PC 1, services provided by each cloud server. Examples of the services provided by each cloud server may include, but are not limited to, a service of managing one or more storage servers and an authentication server and uploading and downloading data between the PC 1 and the one or more storage servers. One of the one or more storage servers may double as an authentication server. Hereinafter, one or more storage servers and an authentication server managed in a single service may be referred to collectively as "cloud servers."

As shown in FIG. 1, the PC 1 includes a controller 10 including a CPU 11, a ROM 12, a RAM 13, and a non-volatile memory 14. The PC 1 further includes a user I/F ("I/F" is an abbreviation of "interface") 15, a network I/F 16, and a USB I/F 17 that are electrically connected with the controller 10. The CPU 11 may be an example of a "processor" according to aspects of the present disclosure. Examples of a "memory" according to aspects of the present disclosure may include, but are not limited to, a buffer of the CPU 11, the ROM 12, the RAM 13, and the non-volatile memory 14.

The ROM 12 stores programs such as a boot program for booting the PC 1. The RAM 13 is usable as a work area when the CPU 10 is performing various kinds of processing or as a storage area to temporarily store data. The non-volatile memory 14 is usable as an area to store various programs, various kinds of data (e.g., image data), and various settings. Examples of the non-volatile memory 14 may include, but are not limited to, HDDs and flash memories.

The CPU 11 is configured to perform various processes based on user operations or in accordance with programs read out of the ROM 12 or the non-volatile memory 14. It is noted that the "controller 10" shown in FIG. 1 is a generic term as which hardware elements and software elements used for controlling the PC 1 are collectively referred to. Hence, the "controller 10" may not necessarily represent a single hardware element actually existing in the PC 1.

The user I/F 15 includes one or more hardware elements for receiving user operations and displaying information. Namely, the user I/F 15 has both a function to receive inputs from the user and a function to display information. The user I/F 15 may be an example of a "display" according to aspects of the present disclosure. The user I/F 15 may include a device (e.g., a touch panel) having both the function to receive inputs from the user and the function to display information, or may have a combination including at least two of a display, a keyboard, and a mouse.

The network I/F 16 includes one or more hardware elements for communicating with external apparatuses (e.g., cloud servers) via the Internet 100. A communication system for the network I/F 16 may be any type of communication system such as a wireless communication system, a wired communication system, a LAN communication system, a Wi-Fi (registered trademark) communication system. Further, the USB I/F 17 includes one or more hardware elements for communicating with the image scanner 2. Instead of the USB I/F 17, the network I/F 16 may be configured to communicate with the image scanner 2.

The non-volatile memory 14 stores various kinds of data and programs including an OS ("OS" is an abbreviation of "Operating System") 40, a scan application 41, and a browser 42. A part of the OS 40 may be stored in the ROM 12. The scan application 41 is a program for performing various kinds of processing using the image scanner 2. The scan application 41 will be described in detail later. The browser 42 is a program for displaying web pages.

It is noted that a storage medium storing the scan application 41 is not limited to the non-volatile memory 14. The storage medium storing the scan application 41 may be a non-transitory computer-readable storage medium. Examples of the non-transitory computer-readable storage medium may include, but are not limited to, recording media such as CD-ROMs and DVD-ROMs, as well as the aforementioned memories such as the buffer of the CPU 11, the ROM 12, the RAM 13, and the non-volatile memory 14. Further, the non-transitory computer-readable storage medium is a tangible medium. On the other hand, electrical signals carrying programs downloaded from servers on the Internet are computer-readable signal media but are not included in the examples of the non-transitory computer-readable storage medium.

Subsequently, the scan application 41 will be described. The scan application 41 is a program configured to, when executed by the CPU 11, cause the controller 10 to transmit scan settings and scanning instructions to the image scanner 2, receive and display image data of an image scanned by the image scanner 2, and store the received image data.

In the following description, processes, operations, and steps of flowcharts may basically represent processing by the CPU 11 in accordance with instructions written in programs such as the scan application 41. Namely, in the following description, operations such as "judging," "determining," "extracting," "selecting," "calculating," "specifying," "acquiring," "obtaining," "receiving," "accepting," and "controlling" may represent processing by the CPU 11. Processing by the CPU 11 may include hardware control using an API ("API" is an abbreviation of "Application Programming Interface") of the OS 40 for exchanging data with the other modules of the OS 40. In the present disclosure, operations by the CPU 11 executing each program may be described without any mention made of the OS 40. Specifically, for instance, a description "a program P controls a hardware element H" may represent "the CPU 11 executing a program P controls a hardware element H by using the API of the OS 40."

Further, "acquiring (obtaining)" may represent or include a concept of acquiring (obtaining) a thing with no need to make a request for the thing. Specifically, for instance, an operation of the CPU 11 receiving data without making a request for the data may be included in a concept "the CPU 11 acquires (obtains) the data." Further, "data" referred to in the present disclosure may be expressed as a computer-readable bit string. Further, two pieces of data that have substantially the same contents and have mutually different formats may be treated as the same data. The same applies to "information" referred to in the present disclosure. Further, "requesting" may represent or include a concept of transmitting information indicating a request to a destination party, and "instructing" may represent or include a concept of transmitting information indicating an instruction to a destination party. Moreover, information indicating a request and information indicating an instruction may be simply referred to as a "request" and an "instruction," respectively.

Further, a process by the CPU 11 in accordance with instructions written in a program may be described in an abbreviated language such as "the CPU 11 performs the process" without any mention made of a relevant program, or "the scan application 41 performs the process" and "a program A performs the process" without any mention made of the CPU 11. Further, determination by the CPU 11 as to whether information A represents a matter B may be described in a conceptional language such as "the CPU 11 determines from information A whether a matter B is correct." Further, determination by the CPU 11 as to whether information A represents a matter B or a matter C may be described in a conceptional language such as "the CPU 11 determines from information A whether a matter B is correct or a matter C is."

In the illustrative embodiment, the scan application 41 is configured to receive instructions to perform various processes regarding a workflow. The workflow is information on a sequence of processes including image scanning and data storing. More specifically, the workflow includes scan setting information regarding scan settings for causing the image scanner 2 to scan an image of a document sheet and storage setting information regarding storage settings including a storage destination to store image data of the scanned image.

In the illustrative embodiment, for instance, the scan application 41 may receive an instruction to generate or perform a workflow. The scan application 41 has a workflow table 81 as shown in FIG. 2, in a particular area of the non-volatile memory 14. The scan application 41 may store, into the workflow table 81, information on each workflow generated based on a user instruction as a workflow record. Further, based on a user instruction to perform a workflow specified by the user, the scan application 41 may read out a workflow record of the specified workflow from the workflow table 81, perform image scanning based on the scan setting information included in the workflow record, and perform data storing based on the storage setting information included in the workflow record.

Hereinafter, a "workflow record" may be simply referred to as a "workflow." In this case, "storing the workflow" may represent "storing information on the workflow as a workflow record." Further, "performing the workflow" may represent "performing the workflow represented by the workflow record."

The workflow table 81 will be described below. As shown in FIG. 2, the workflow table 81 has, for each workflow, a name 811 of each workflow, scan settings 812, a storage destination 813, a storage location 814, and a use token 815. The name 811 of each workflow is information for identifying each workflow. The scan settings 812 contain settings for image scanning such as a specified image scanner to be used, a scanning resolution, and a setting regarding color scanning or monochrome scanning.

The storage destination 813 is information for specifying "Cloud Server" or "PC" as a storage destination for image data. Specifically, for instance, the scan application 41 may receive a selection between the non-volatile memory 14 of the PC 1 and a particular cloud server, as the storage destination for image data. When the storage destination 813 is "PC," the storage location 814 is information representing a folder into which image data is to be stored. When the storage destination 813 is "Cloud Server," the storage location 814 is information representing a service to which image data is to be uploaded. The scan application 41 has a plurality of services registered as selectable options for the storage location 814. In response to receiving a selection from the registered services, the scan application 41 stores information on the selected service as the storage location 814.

The use token 815 is information representing how to obtain a token to be used for the corresponding workflow when the storage destination 813 is "Cloud Server." An authentication procedure is required to upload image data to a cloud server. For instance, each service managing a cloud server has a management system to manage the cloud server in an authentication method using OAuth 2.0. In the authentication method using OAuth 2.0, the scan application 41 may obtain a token issued from an intended service by previously transmitting account information of the user to a corresponding cloud server, and may transmit a request with the obtained token to the intended service in an attempt to use the service. The token(s) may be an example of "authentication information" according to aspects of the present disclosure.

Figure 3:
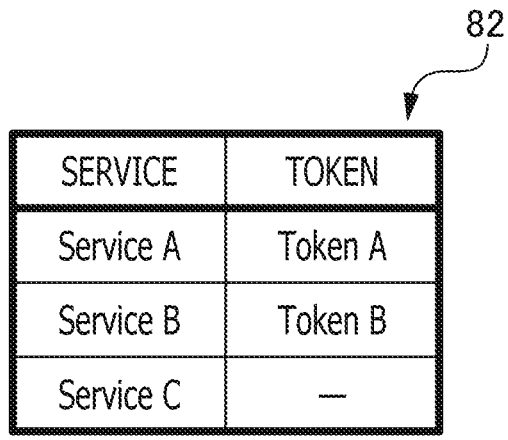
FIG. 3 shows an example of an authentication information table in the illustrative embodiment according to one or more aspects of the present disclosure.

The use token 815 will be described below. In the illustrative embodiment, when obtaining a token via the authentication procedure, the scan application 41 stores the obtained token in association with information representing a service into the non-volatile memory 14, as an authentication information table 82. In FIG. 3, each of "Service A," "Service B," and "Service C" is information representing a corresponding service. Further, each of "Token A" and "Token B" is information representing a corresponding token for using an associated service. FIG. 3 shows an example where a token (see "Token A") for "Service A" and a token (see "Token B") for "Service B" have been already obtained among three services available to the scan application 41, and the obtained tokens are stored, but a token for "Service C" has not been obtained. The authentication information table 82 may be an example of a "first table" according to aspects of the present disclosure.

In an attempt to upload image data to a service for which the authentication procedure has been completed, the scan application 41 is allowed to use a token stored in association with the service on the authentication information table 82. Namely, in response to receiving an instruction to upload image data to a cloud server without using a workflow, when determining that a token is stored in association with a corresponding service on the authentication information table 82, the scan application 41 may read out the associated token from the authentication information table 82 and transmit a request with the token to the service. The token stored on the authentication information table 82 is a default token that is usable in common when the scan application 41 utilizes the service. On the workflow table 81 (see FIG. 2), information representing "Default" is stored as the use token 815 for a workflow using a default token read out of the authentication information table 82.

In the meantime, even when using a same service, a user may wish to use an account different from an account used to obtain an associated default token, to perform a corresponding workflow. For instance, when a workflow is performed on a PC shared by a plurality of users, or a generated workflow is used in common with the plurality of users, each individual user may be provided with a personal account that is different from a default account usable in common with the plurality of users. The scan application 41 may accept use of a specific token as a token used for performing a workflow. The specific token is obtained with an account different from an account used to obtain a default token stored on the authentication information table 82. On the workflow table 81 (see FIG. 2), information representing "Specific" is registered as the use token 815 for a workflow using a specific token different from an associated default token.

Figure 4:
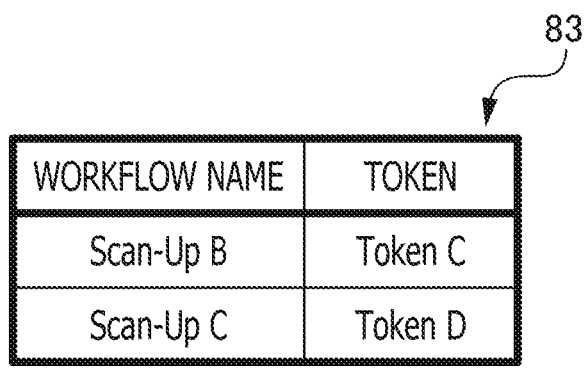
FIG. 4 is an example of a specific token table in the illustrative embodiment according to one or more aspects of the present disclosure.

On the workflow table 81 (see FIG. 2), information representing whether to use a specific token or a default token is stored as the use token 815, but a token itself is not stored. The scan application 41 stores, onto a specific token table 83 as shown in FIG. 4, a specific token obtained via the authentication procedure using a specific account, in association with identification information of a workflow using the specific token. In FIG. 4, each of "Scan-Up B" and "Scan-Up C" is information representing a corresponding workflow. Further, each of "Token C" and "Token D" is information representing a corresponding token to be used to perform an associated workflow. FIG. 4 shows an example in which the specific token "Token C" is registered in association with the workflow having the name "Scan-Up B," and the specific token "Token D" is registered in association with the workflow having the name "Scan-Up C." The specific token table 83 may be an example of a "second table" according to aspects of the present disclosure. The specific token table 83 may have a plurality of workflows registered thereon.

Each token stored on the specific token table 83 is, for instance, a specific token stored in association with identification information of a workflow when the workflow has been generated. Further, as will be described later, each token stored on the specific token table 83 may be updated for a reason such as expiration thereof.

In the illustrative embodiment, the scan application 41 may receive various instructions to perform processes related to a workflow, such as an instruction to generate the workflow, an instruction to perform the workflow, an instruction to export the workflow and generate an export file, and an instruction to import the workflow from the export file. Exporting the workflow is a process of storing, into an area outside the scan application 41, information on the workflow registered on the workflow table 81 as a file having a particular file format. Importing the workflow is a process of reading the exported file and storing the read file in a format usable by the scan application 41 onto the workflow table 81.

Figure 5:
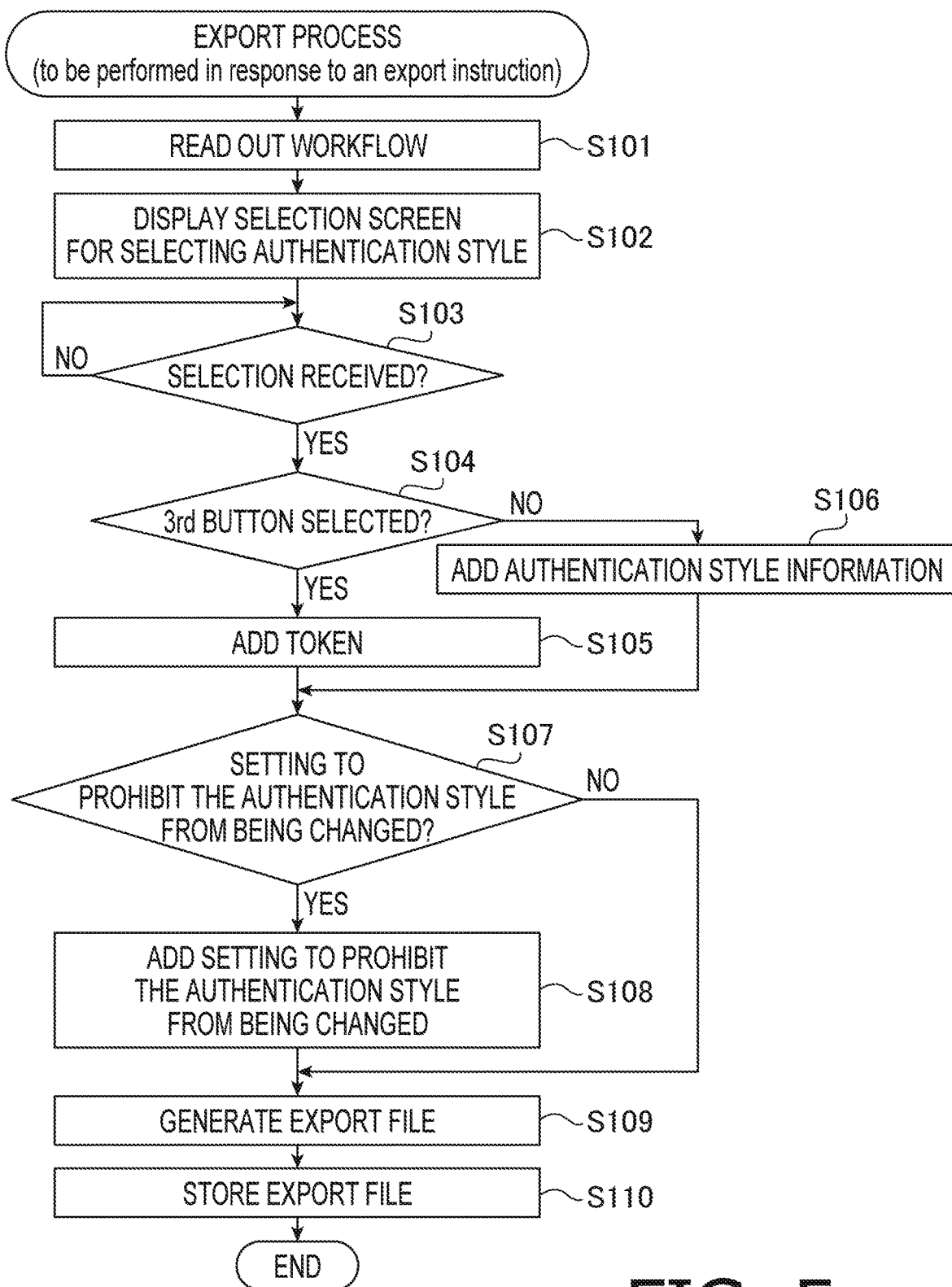
FIG. 5 is a flowchart showing a procedure of an export process by the PC in the illustrative embodiment according to one or more aspects of the present disclosure.

Referring to FIG. 5, an explanation will be provided of a procedure of an export process of exporting a workflow by the CPU 11 executing the scan application 41. The CPU 11, executing the scan application 41, performs the export process in response to receiving designation of a workflow to be exported and an export instruction to export the designated workflow. The following description will be provided under an assumption that the designated workflow to be exported is a workflow using a service provided by a cloud server.

In the export process, the CPU 11 reads out the designated workflow from the workflow table 81 (S101). Then, the CPU 11 controls the user I/F 15 to display a selection screen 51 (see FIG. 6) for prompting the user to select an authentication style for the designated workflow to be exported (S102). The authentication style represents how to obtain a token for using the service provided by the cloud server when the CPU 11 executing the scan application 41 performs the workflow imported via the scan application 41. The scan application 41 may incorporate information on the selected authentication style into an export file.

Figure 6:
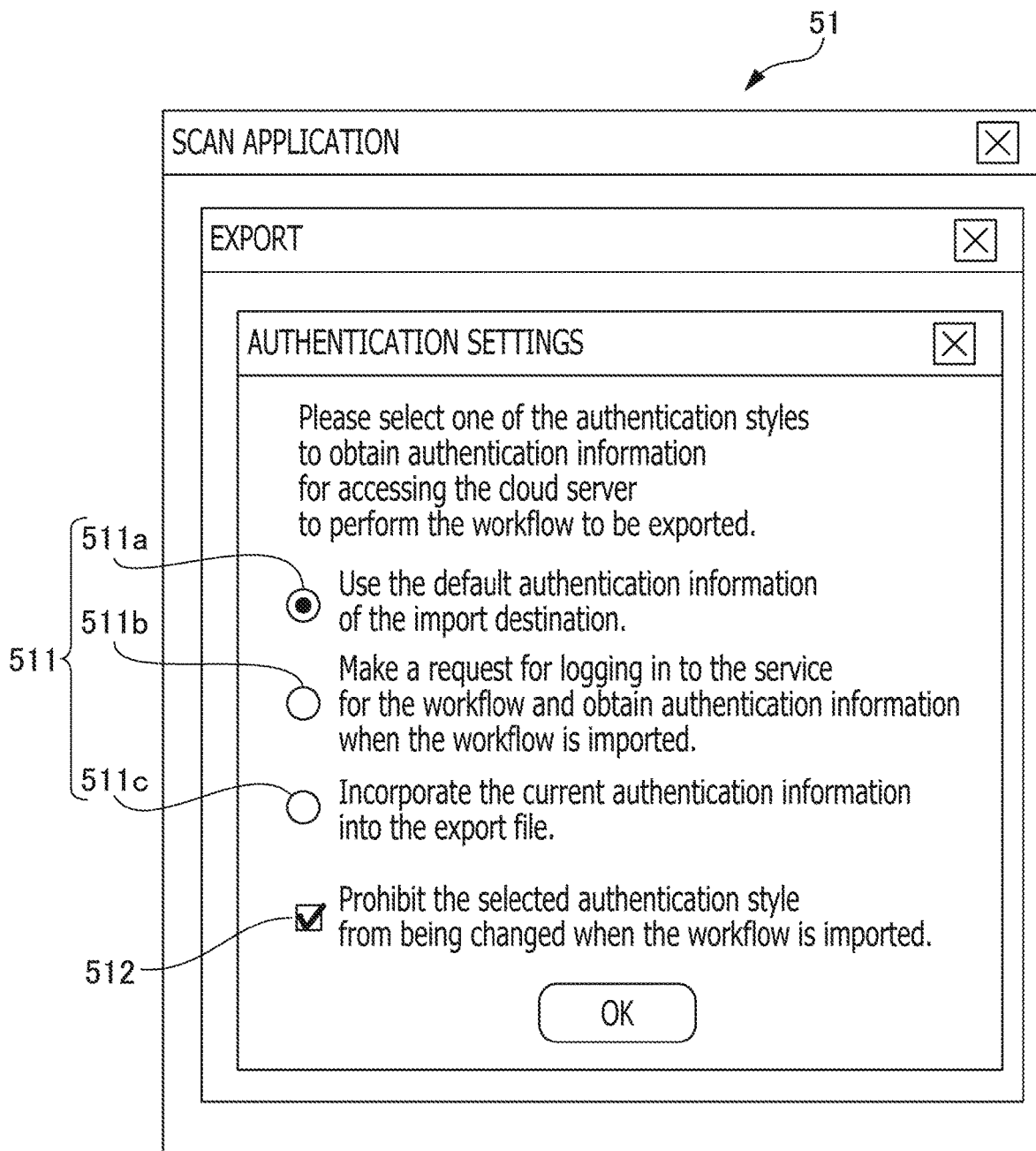
FIG. 6 shows an example of a selection screen for prompting a user to select one of authentication styles to obtain authentication information for accessing a cloud server to perform a workflow to be exported, in the illustrative embodiment according to one or more aspects of the present disclosure.

FIG. 6 is an example of the selection screen 51. As shown in FIG. 6, the selection screen 51 includes selectable buttons 511 for selecting one of three authentication styles, and a setting field 512 for receiving a setting to prohibit the selected authentication style from being changed when the workflow is imported. For instance, the selectable buttons 511 displayed on the selection screen 51 include a first button 511*a*, a second button 511*b*, and a third button 511*c*. The first button 511*a* is associated with an authentication style to use default authentication information of an import destination. The second button 511*b* is associated with an authentication style to obtain a token when the workflow is imported. The third button 511*c* is associated with an authentication style to use authentication information included in the export file. The CPU 11 receives a selection from the selectable buttons 511 (i.e., the selectable authentication styles).

Specifically, the first button 511*a* is associated with an authentication style to use a default token stored on the authentication information table 82 of the scan application 41 of the import destination. The second button 511*b* is associated with an authentication style to prompt a user who has imported the workflow from the export file to obtain an individual token. The third button 511c is associated with an authentication style to incorporate a token into the export file.

For instance, the first button 511a is selected when a user who uses the scan application 41 on a plurality of PCs wishes to perform the same workflow on a PC different from the PC 1 currently in use, or wishes the workflow to be performed with a particular account of each import destination. Further, for instance, the second button 511b is selected when the export file is provided to a user who attempts to upload the export file to a cloud server via the scan application 41 for the first time. When the first button 511a or the second button 511b is selected, the export file does not include a token. Therefore, in this case, there is no risk that a token might leak out when the workflow is exported.

Meanwhile, when the third button 511c is selected, the generated export file includes the token for using the service provided by the cloud server. For instance, the third button 511c is selected when a same account is used in common with a plurality of users without information on the account being disclosed to the public. When the workflow is imported from the export file generated in response to selection of the third button 511c, the user obtains the token included in the export file. Therefore, in this case, there is no need for the authentication procedure.

Referring back to FIG. 5 to continue to explain the export process, the CPU 11 determines whether the CPU 11 has received a selection from the selectable authentication styles via the selection screen 51 (S103). When determining that the CPU 11 has not received a selection from the authentication styles via the selection screen 51 (S103: No), the CPU 11 waits until the CPU 11 receives a selection from the authentication styles via the selection screen 51. When determining that the CPU 11 has received a selection from the authentication styles via the selection screen 51 (S103: Yes), the CPU 11 determines whether the third button 511c has been selected (S104).

When determining that the third button 511c has been selected (S104: Yes), the CPU 11 adds a token to information on the workflow to be exported (S105). Specifically, when the use token 815 for the workflow to be exported is "Default," the CPU 11 reads out a corresponding token from the authentication information table 82 and adds the token to the export file. Further, when the use token 815 for the workflow to be exported is "Specific," the CPU 11 reads out a corresponding token from the specific token table 83 and adds the token to the export file.

Meanwhile, when determining that the third button 511c has not been selected (S104: No), the CPU 11 adds information (hereinafter, which may be referred to as "authentication style information") representing the selected authentication style to the information on the workflow to be exported (S106). It is noted that the authentication style information is information representing which has been selected of the first and second buttons 511a and 511b. The authentication style information may be an example of "particular information" according to aspects of the present disclosure.

Then, the CPU 11 determines whether the CPU 11 has received the setting to prohibit the authentication style from being changed when the workflow is imported, via the setting field 512 on the selection screen 51 (S107). When determining that the CPU 11 has received the setting to prohibit the authentication style from being changed when the workflow is imported (S107: Yes), the CPU 11 adds unchangeable-style information to the information on the workflow to be exported (S108). The unchangeable-style information represents that the authentication style is not allowed to be changed when the workflow is imported. The unchangeable-style information may be an example of "method-changeability information" according to aspects of the present disclosure. As described above, in the illustrative embodiment, when the authentication style is not allowed to be changed when the workflow is imported, the unchangeable-style information is added to the information on the workflow to be exported. Nonetheless, when the authentication style is not allowed to be changed when the workflow is imported, selection-acceptability information, representing whether a selection from the authentication styles is acceptable when the workflow is imported, may be added to the information on the workflow to be exported, instead of the unchangeable-style information. In this case, even when the authentication style is allowed to be changed when the workflow is imported, the selection-acceptability information may be added to the information on the workflow to be exported.

After S108, or when determining that the CPU 11 has not received the setting to prohibit the authentication style from being changed when the workflow is imported (S107: No), the CPU 11 generates the export file (S109). The export file includes the scan settings and the storage settings included in the designated workflow. Further, the export file may include information regarding the authentication as added in S105, S106, or S108. Further, the CPU 11 stores the generated export file into a specified location (S110). Afterward, the CPU 11 terminates the export process.

Figure 7:
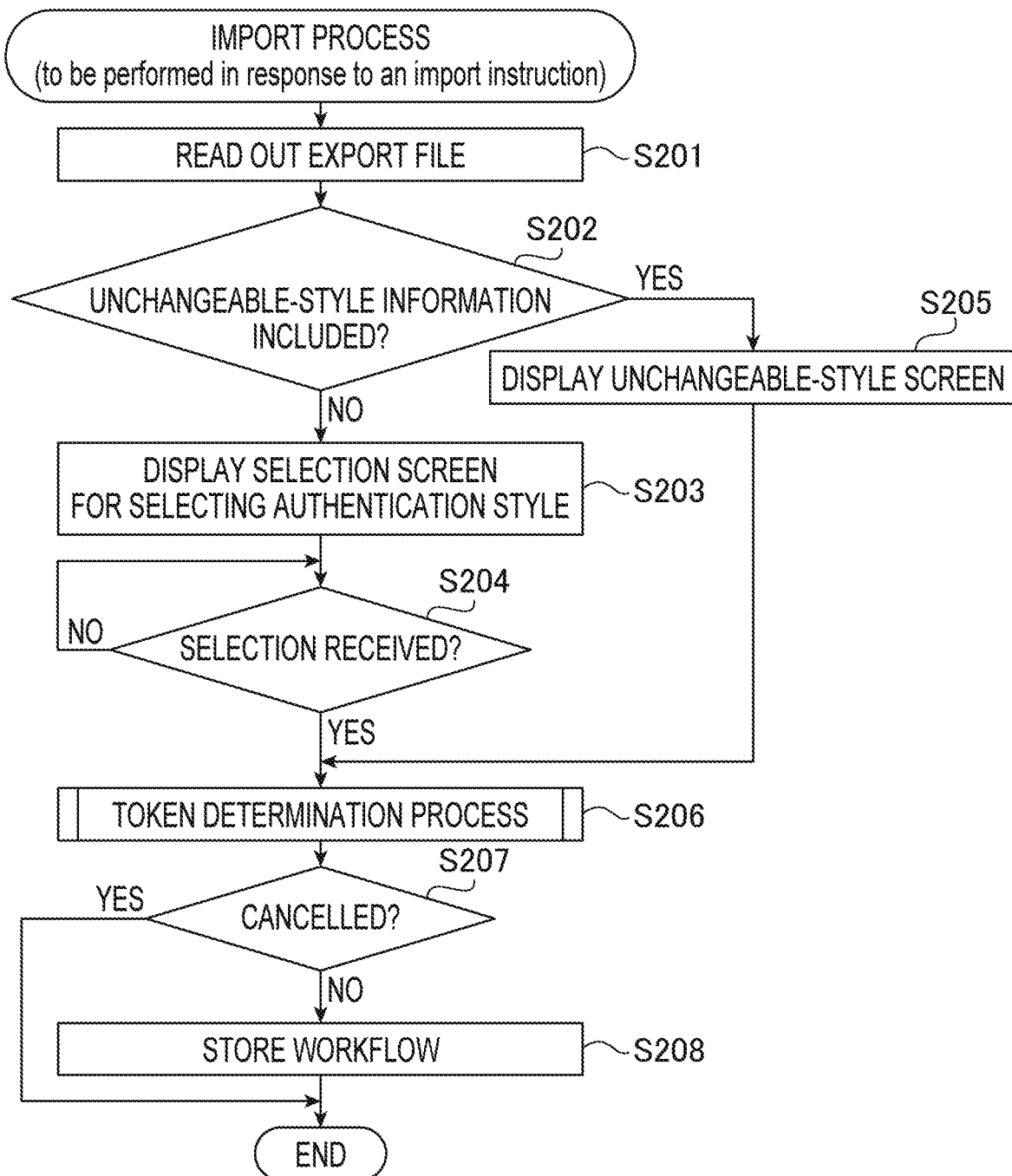
FIG. 7 is a flowchart showing a procedure of an import process by the PC in the illustrative embodiment according to one or more aspects of the present disclosure.

Subsequently, referring to FIG. 7, an explanation will be provided of a procedure of an import process of importing a workflow by the CPU 11 executing the scan application 41. The CPU 11 executing the scan application 41 performs the import process in response to receiving designation of an export file and an import instruction to import a workflow from the designated export file. The following description will be provided under an assumption that the workflow (hereinafter, which may be referred to as the "import-target workflow") to be imported is a workflow using a service provided by a cloud server.

In the import process, the CPU 11 first reads out the designated export file (S201). The export file may be the file generated in S109 of the aforementioned export process. The export file includes workflow information representing the settings for the workflow and the information representing the selected authentication style. Further, the export file may include the unchangeable-style information. The unchangeable-style information is the information added in S108 of the export process and representing that the authentication style is not allowed to be changed when the workflow is imported.

Then, the CPU 11 determines whether the read export file includes the unchangeable-style information (S202). When determining that the read export file does not include the unchangeable-style information (S202: No), the CPU 11 controls the user I/F 15 to display a selection screen 52 (see FIG. 8) for receiving a selection of an authentication style for obtaining a token used to perform the import-target workflow (S203).

Figure 8:
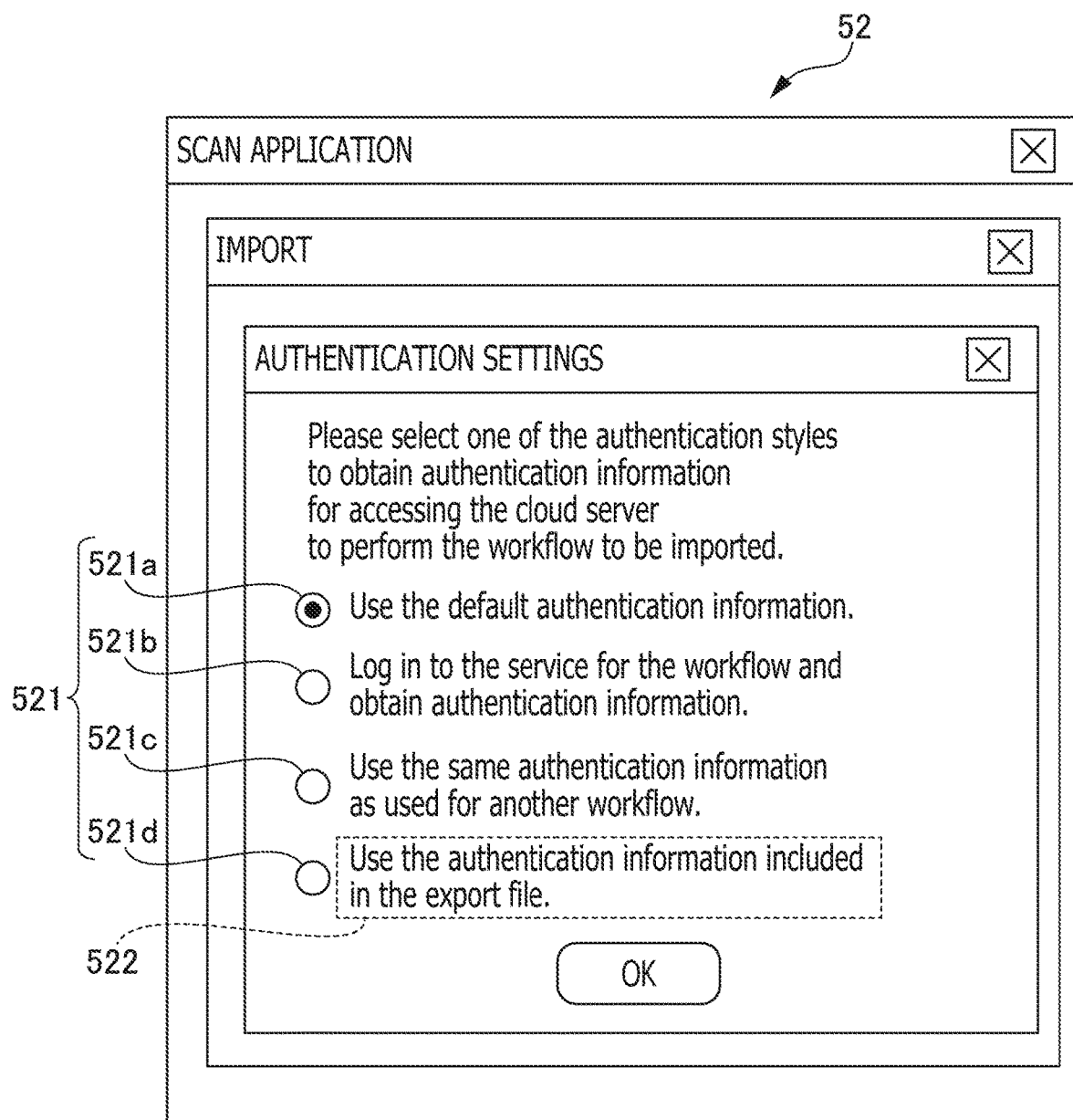
FIG. 8 shows an example of a selection screen for prompting a user to select one of authentication styles to obtain authentication information for accessing a cloud server to perform a workflow to be imported, in the illustrative embodiment according to one or more aspects of the present disclosure.

FIG. 8 shows an example of the selection screen 52 for receiving a selection from the selectable authentication styles. The selection screen 52 shown in FIG. 8 includes selectable buttons 521 displayed thereon. The selectable buttons 521 are for selecting one of the three or four selectable authentication types. The selectable buttons 521, displayed on the selection screen 52 shown in FIG. 8, include a first button 521a, a second button 521b, and a third button 521c that are associated with respective selectable authentication types.

Specifically, the first button 521a is associated with an authentication style to use a default token stored on the authentication information table 82 of the scan application 41 to perform the import-target workflow. The second button 521b is associated with such an authentication style as to, when importing the workflow from the designated export file, log in to the service used for performing the import-target workflow and obtain an individual token. The third button 521c is associated with such an authentication style as to, when there is a workflow registered on the workflow table 81 in association with the same service as used for performing the import-target workflow, use a token for the registered workflow to perform the import-target workflow.

In S203, the CPU 11 displays the selection screen 52 (see FIG. 8) in an initial state where an authentication style specified by the authentication style information included in the export file is selected as a default authentication style. It is noted that the authentication style information has been added to the export file in S106 of the export process. For instance, as shown in FIG. 6, when the first button 511a is selected on the selection screen 51 in the export process, the CPU 11 displays the selection screen 52 in an initial state where the first button 521a is selected as shown in FIG. 8.

Further, when the export file includes a token, a fourth button 521d is displayed on the selection screen 52 (see FIG. 8) as an additional selectable button. An option 522, which includes the fourth button 521d and a relevant caption and is surrounded by a dashed line on the selection screen 52 shown in FIG. 8, is not displayed on the selection screen 52 when the export file does not include a token. It is noted that the export file, generated by adding a token to the information on the workflow in S105 of the export process (see FIG. 5), includes the token. The fourth button 521d is associated with an authentication style to use the token included in the export file. When the export file includes the token, the CPU 11 sets the authentication style associated with the fourth button 521d as the default authentication style.

Then, the CPU 11 determines whether the CPU 11 has received a selection from the selectable buttons 521 via the selection screen 52 (S204). When determining that the CPU 11 has not received a selection from the selectable buttons 521 (S204: No), the CPU 11 waits until the CPU 11 receives a selection from the selectable buttons 521.

Meanwhile, when determining that the read export file includes the unchangeable-style information (S202: Yes), the CPU 11 controls the user I/F 15 to display an unchangeable-style screen 53 (see FIG. 9) (S205).

Figure 9:
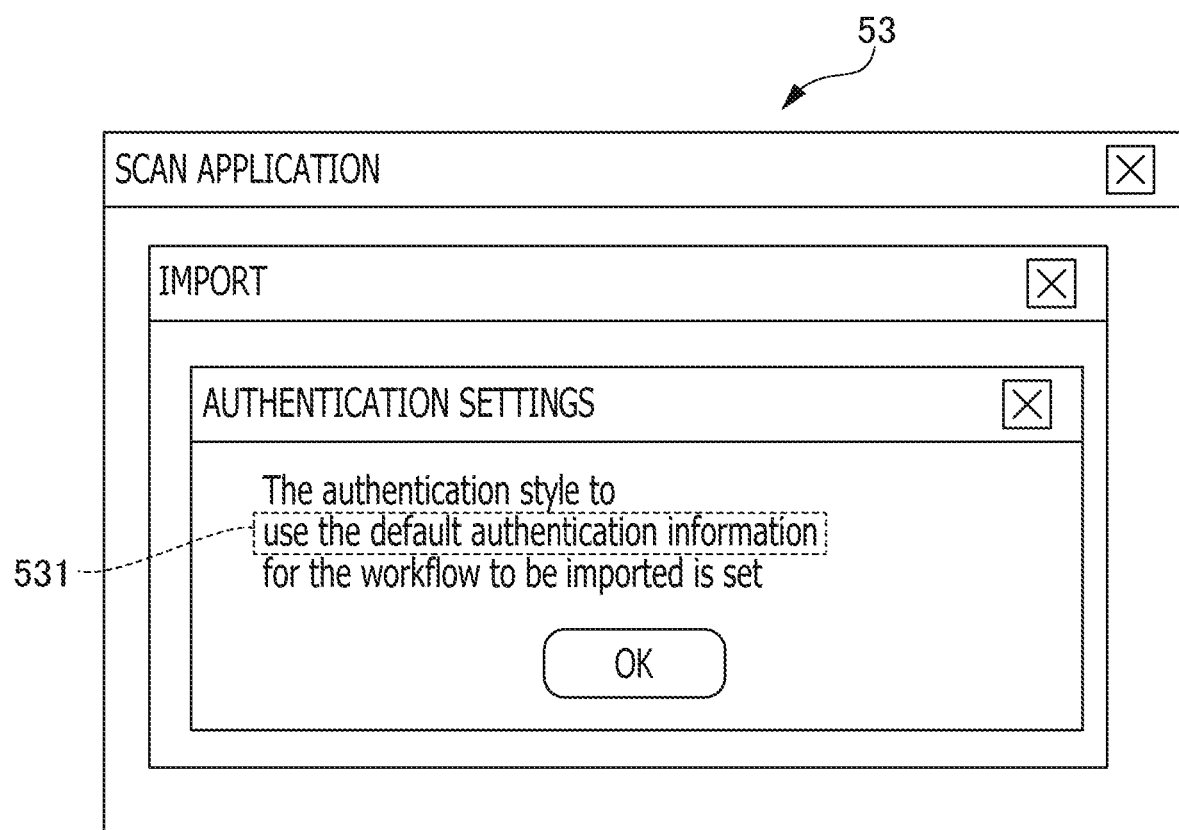
FIG. 9 shows an example of an unchangeable-style screen in the illustrative embodiment according to one or more aspects of the present disclosure.

FIG. 9 shows an example of the unchangeable-style screen 53. As shown in FIG. 9, the unchangeable-style screen 53 displays thereon information representing the authentication style set in the export file. When importing the workflow from the export file including the unchangeable-style information, the scan application 41 does not receive a selection from the selectable authentication styles. In an area 531 surrounded by a dashed line on the unchangeable-style screen 53 shown in FIG. 9, information representing the authentication style set in the export file is displayed. For instance, when the first button 511a is selected via the selection screen 51 in the export process, the unchangeable-style screen 53 displays thereon information representing that the authentication style to use a default token stored on the authentication information table 82 is selected, as shown in FIG. 9.

Figure 10A:
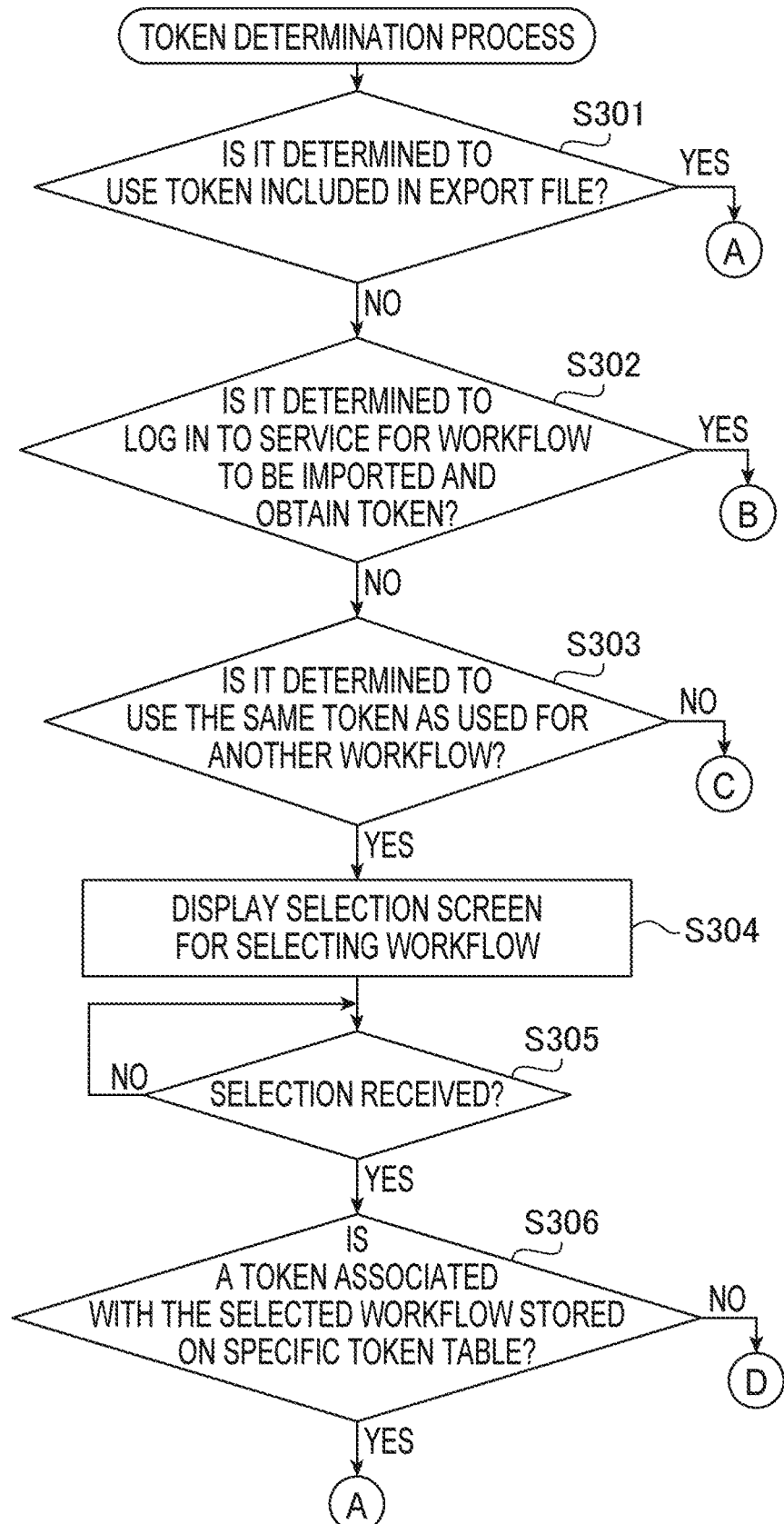
FIGS. 10A and 10B are flowcharts showing a procedure of a token determination process by the PC in the illustrative embodiment according to one or more aspects of the present disclosure.
Figure 10B:
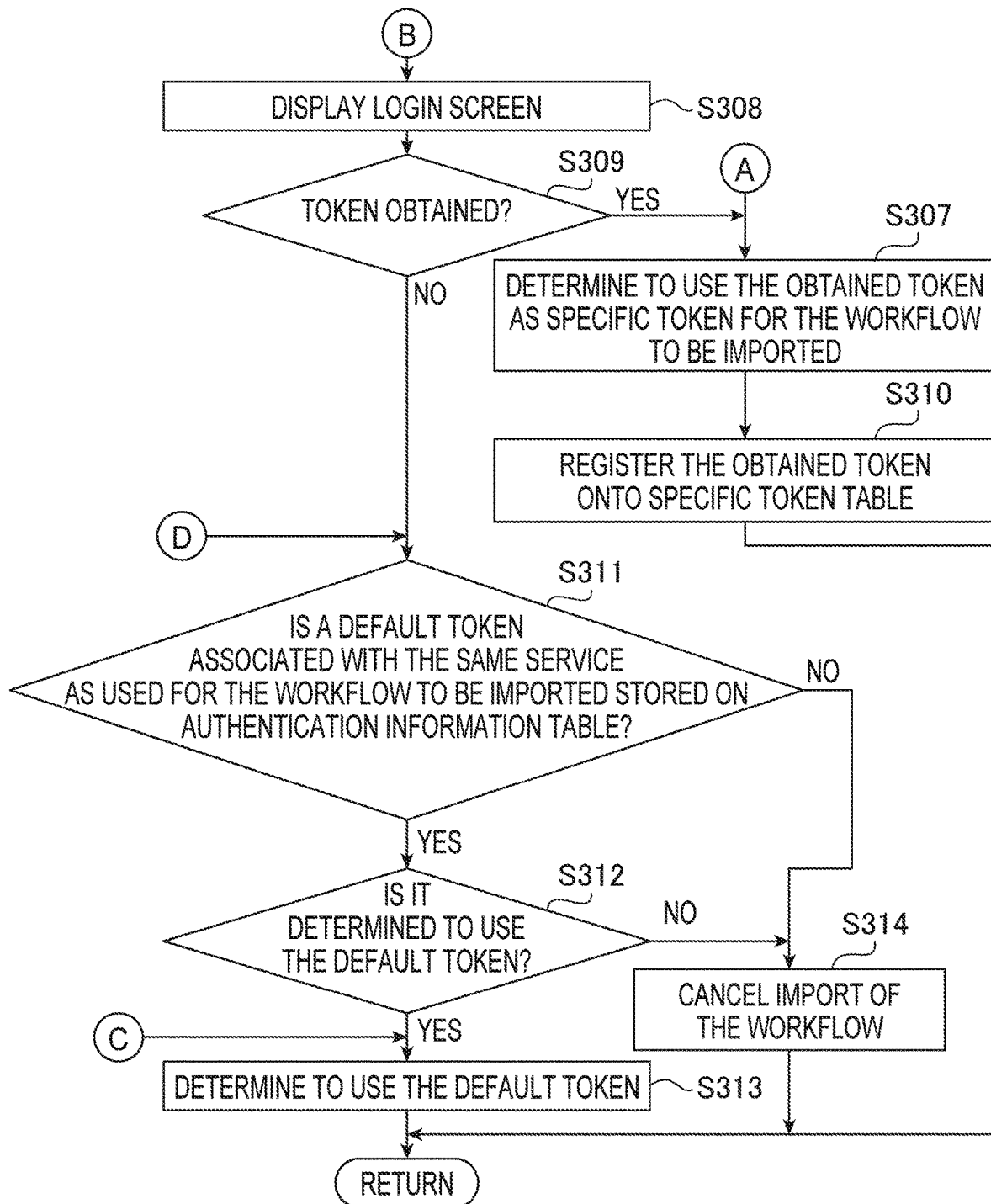

When determining that the CPU 11 has received a selection from the selectable buttons 521 (S204: Yes), or after S205, the CPU 11 performs a token determination process to determine how to obtain a token used for performing the import-target workflow (S206). The token determination process will be described with reference to FIGS. 10A and 10B.

In the token determination process, the CPU 11 first determines whether to use a token included in the export file (S301). When the export file includes a token and the unchangeable-style information, the CPU 11 determines to use the token included in the export file (S301: Yes). Further, when the export file includes a token, and the fourth button 521d is selected via the selection screen 52, the CPU 11 also determines to use the token included in the export file (S301: Yes).

When determining not to use the token included in the export file (S301: No), the CPU 11 determines whether to log in to the service for performing the import-target workflow and obtain a token (S302). When the export file does not include a token, or it is determined to use a token other than the token included in the export file, the CPU 11 determines not to use the token included in the export file (S301: No). When determining not to log in to the service for performing the import-target workflow or obtain a token (S302: No), the CPU 11 determines whether to use the same token as used for another workflow (S303).

When determining to use the same token as used for another workflow (S303: Yes), the CPU 11 controls the user I/F 15 to display a selection screen for prompting the user to select a workflow (S304). When the export file does not include the unchangeable-style information, and the third button 521c is selected via the selection screen 52, the CPU 11 determines to use the same token as used for another workflow (S303: Yes).

In S304, the CPU 11 attempts to extract one or more workflows using the same service as used for the import-target workflow from among the workflows stored on the workflow table 81, and causes the user I/F 15 to display a list of names of the extracted workflows. Then, the CPU 11 determines whether the CPU 11 has received a selection from the list of the names of the extracted workflows displayed on the user I/F 15 (S305). When determining that the CPU 11 has not received a selection from the list of the names of the extracted workflows (S305: No), the CPU 11 waits until the CPU 11 receives a selection from the list of the names of the extracted workflows.

When determining that the CPU 11 has received a selection from the list of the names of the extracted workflows (S305: Yes), the CPU 11 determines whether a token associated with the selected workflow is stored on the specific token table 83 (S306). When determining that a token associated with the selected workflow is stored on the specific token table 83 (S306: Yes), the CPU 11 determines to use the stored token as a specific token for the import-target workflow (S307).

Even though the CPU 11 determines to use the same token as used for another workflow (S303: Yes), when a workflow using the same service as used for the import-target workflow is not stored on the workflow table 81, the CPU 11 skips S304 and S305, and determines that a token associated with the selected workflow is not stored on the specific token table 83 (S306: No).

Meanwhile, when determining to log in to the service for performing the import-target workflow and obtain a token (S302: Yes), the CPU 11 boots the browser 42 (see FIG. 1) and causes the browser 42 to display a login screen of the service set for the import-target workflow (S308). The CPU 11 receives a user operation to input account information via the browser 42, and transmits the received account information to the cloud server. Then, the CPU 11 determines whether the CPU 11 has obtained a token from the cloud server (S309). When determining that the CPU 11 has obtained a token from the cloud server (S309: Yes), the CPU 11 determines to use the obtained token as a specific token (S307).

Further, when determining to use the token included in the export file (S301: Yes), the CPU 11 determines to use the obtained token as a specific token (S307).

After determining, in S307, the method for obtaining a token used as a specific token, the CPU 11 obtains the token in the determined method, and registers onto the specific token table 83 information on the obtained token in association with the identification information of the import-target workflow (S310). Thereafter, the CPU 11 terminates the token determination process and returns to the import process.

Specifically, when determining to use a token included in the export file (S301: Yes), the CPU 11 registers the token included in the export file onto the specific token table 83 (S310). When determining that a token associated with the selected workflow is stored on the specific token table 83 (S306: Yes), the CPU 11 registers, onto the specific token table 83, a copy of the token stored in association with the selected workflow on the specific token table 83 (S310). When determining that the CPU 11 has obtained a token from the cloud server (S309: Yes), the CPU 11 registers the token obtained from the cloud server onto the specific token table 83 (S310). Further, in S310, the CPU 11 sets the use token 815 for the import-target workflow to "Specific."

Meanwhile, when determining that a token associated with the selected workflow is not stored on the specific token table 83 (S306: No) or that the CPU 11 has not obtained a token from the cloud server (S309: No), the CPU 11 determines whether a default token associated with the same service as used for the import-target workflow is stored on the authentication information table 82 (S311). When determining that a default token associated with the same service as used for the import-target workflow is stored on the authentication information table 82 (S311: Yes), the CPU 11 determines whether to use the default token (S312). For instance, in S312, the CPU 11 may inquire of the user whether it is acceptable to use the default token.

Then, when determining to use the default token (S312: Yes) or determining not to use the same token as used for any other workflow (S303: No), the CPU 11 determines to use the default token (S313). Afterward, the CPU 11 terminates the token determination process and returns to the import process. Further, in S313, the CPU 11 sets the use token 815 for the import-target workflow to "Default."

It is noted that, in S313, the CPU 11 may read out the default token associated with the same service as used for the import-target workflow from the authentication information table 82, may register the default token in association with the identification information of the import-target workflow onto the specific token table 83, and may set the use token 815 for the import-target workflow to "Specific." As will be described later, in an attempt to perform a workflow associated with "Specific" as the use token 815, the scan application 41 reads out a token from the specific token table 83 and uses the read token.

Meanwhile, when determining that a default token associated with the same service as used for the import-target workflow is not stored on the authentication information table 82 (S311: No), or determining not to use the default token (S312: No), the CPU 11 cancels import of the import-target workflow (S314). Afterward, the CPU 11 terminates the token determination process and returns to the import process.

Referring back to FIG. 7, the explanation of the import process is continued. After the token determination process in S206, the CPU 11 determines whether import of the import-target workflow has been cancelled (S207). When determining that import of the import-target workflow has not been cancelled (S207: No), the CPU 11 stores, onto the workflow table 81, workflow information on the import-target workflow and information on the use token 815 determined in the token determination process in association with the identification information of the import-target workflow (S208). After S208 or when determining that import of the import-target workflow has been cancelled (S207: Yes), the CPU 11 terminates the import process.

It is noted that examples of the selectable authentication styles at the time of generating the export file are not limited to the examples shown in FIG. 6. For instance, selectable options on the selection screen 51 may include an option to "leave it to the import destination to make a selection from among the authentication styles." When the option to "leave it to the import destination to make a selection from among the authentication styles" is selected, the export file may include information representing the selected option. Further, the selectable options on the selection screen 51 may include an option to "generate the export file without selecting any of the authentication styles." When the option to "generate the export file without selecting any of the authentication styles" is selected, the export file may not include the authentication style information, or may include information representing that it is left to the import destination to make a selection from among the authentication styles. Further, the export file may be generated with no unchangeable-style information included.

Further, the scan application 41 may be configured not to receive a selection from the authentication styles when generating the export file. In this case, the export file may be generated with no information on the authentication styles included.

When importing the import-target workflow from the export file including the information on the option to "leave it to the import destination to make a selection from among the authentication styles" or from the export file not including any information on the authentication styles, the CPU 11 may perform S203 in the import process regardless of whether the export file includes the unchangeable-style information. In this case, for instance, the CPU 11 may fixedly set the authentication style associated with the first button 521a as the default authentication style that is initially selected on the selection screen 52 (see FIG. 8) when the selection screen 52 is displayed. In another instance, the CPU 11 may set an authentication style selected in S204 of the import process last performed.

Figure 11A:
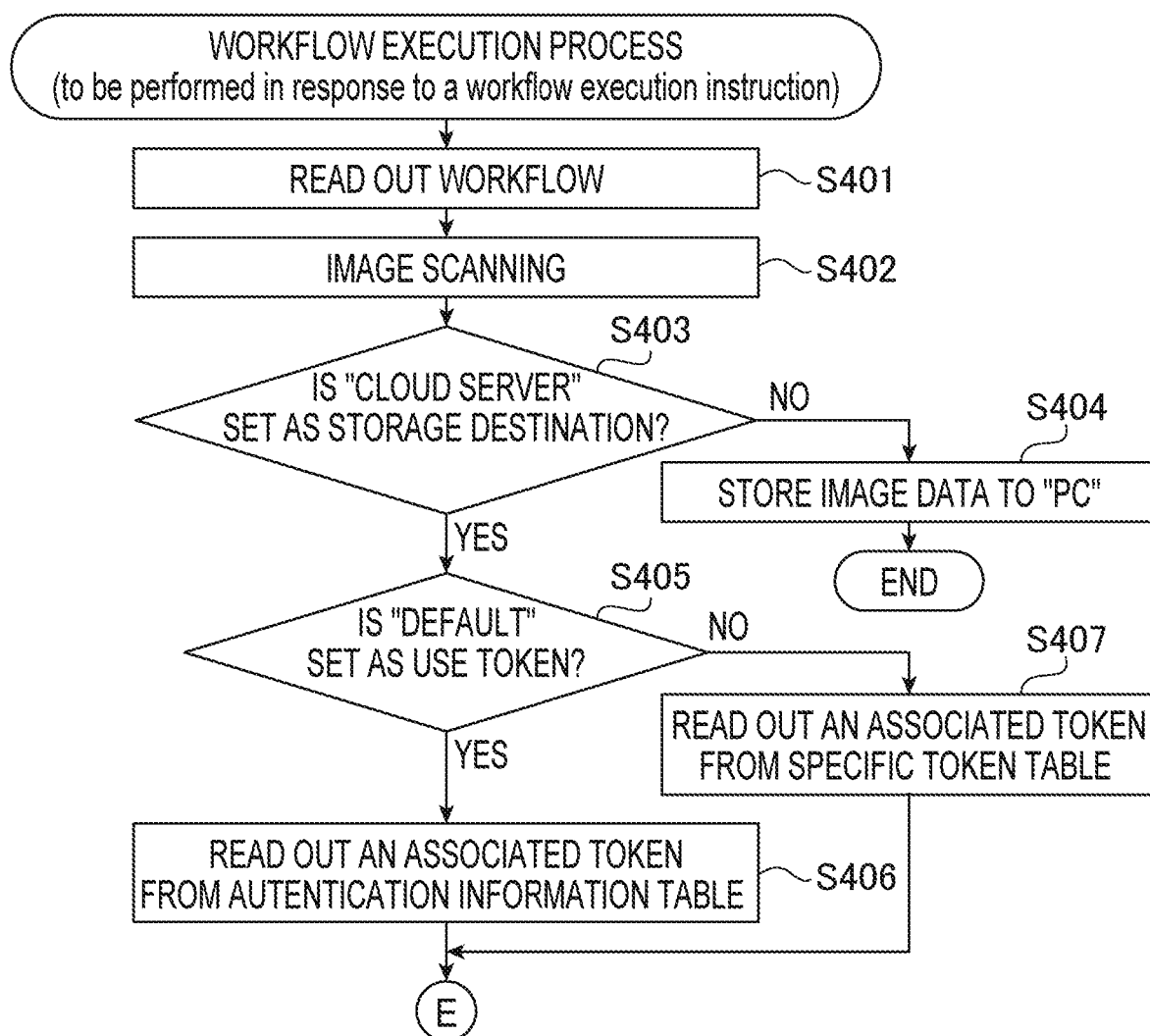
FIGS. 11A and 11B are flowcharts showing a procedure of a workflow execution process by the PC in the illustrative embodiment according to one or more aspects of the present disclosure.
Figure 11B:
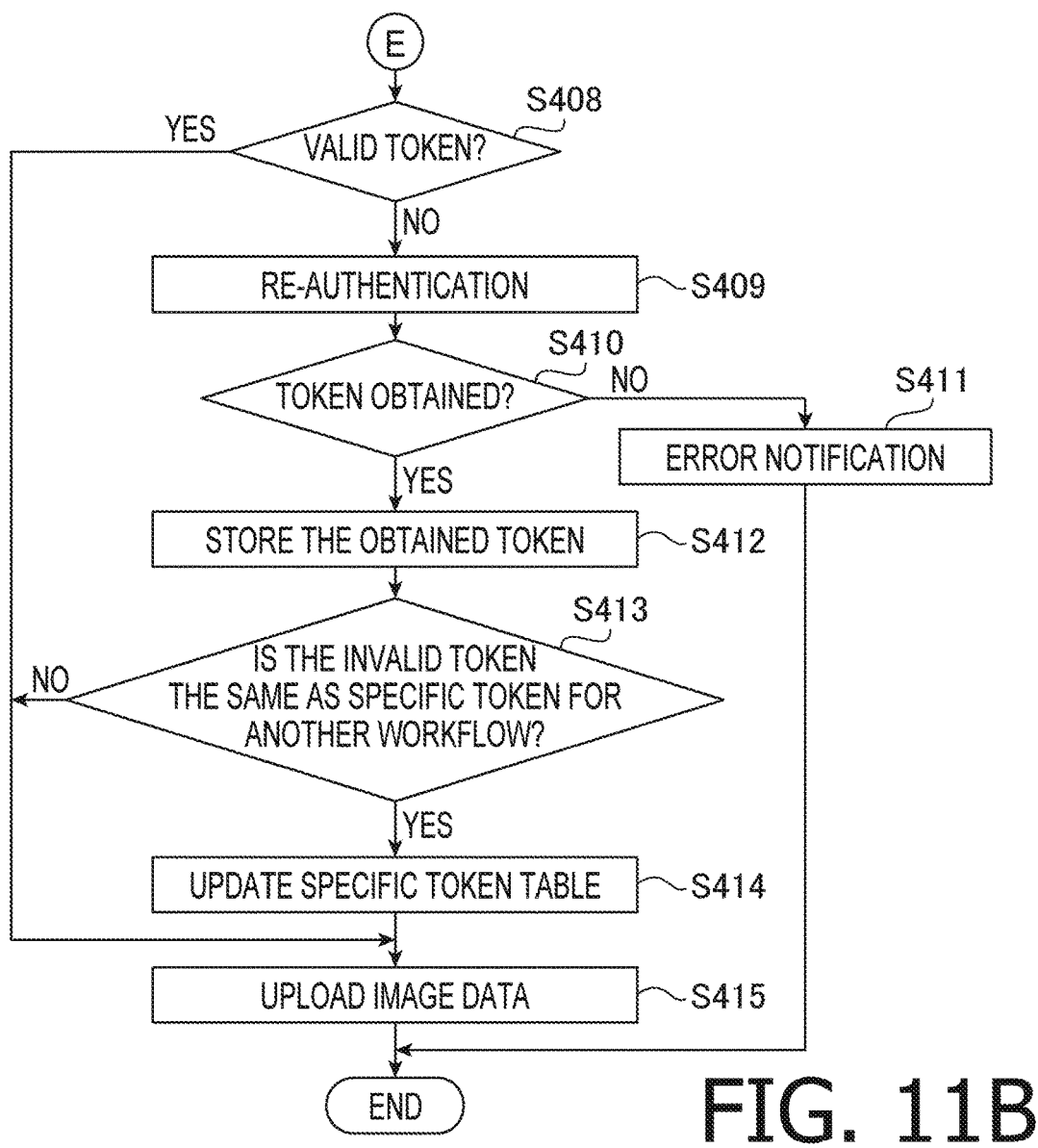

Subsequently, referring to FIGS. 11A and 11B, an explanation will be provided of a procedure of a workflow execution process by the CPU 11 executing the scan application 41 in the illustrative embodiment. The scan application 41 may receive an operation for selecting one of the workflows registered on the workflow table 81 stored in the non-volatile memory 14 and an operation for providing a workflow execution instruction to perform the selected workflow. The CPU 11 performs the workflow execution process in response to receiving a selection from the workflows registered on the workflow table 81 and the workflow execution instruction via the scan application 41.

In the workflow execution process, the CPU 11 first reads out a workflow record of the selected workflow from the workflow table 81 (S401). The CPU 11 controls the image scanner 2 to perform image scanning in accordance with the scan settings 812 for the selected workflow in the read workflow record, thereby obtaining image data (S402).

Then, the CPU 11 determines whether "Cloud Server" is set as the storage destination 813 for the selected workflow (S403). When determining that "Cloud Server" is not set as the storage destination 813 for the selected workflow, i.e., that "PC" is set as the storage destination 813 for the selected workflow (S403: No), the CPU 11 stores the image data obtained in S402 into a folder specified as the storage location 814 for the selected workflow (S404). Afterward, the CPU 11 terminates the workflow execution process.

Meanwhile, when determining that "Cloud Server" is set as the storage destination 813 for the selected workflow (S403: Yes), the CPU 11 determines whether "Default" is set as the use token 815 for the selected workflow (S405). When determining that "Default" is set as the use token 815 for the selected workflow, i.e., that a default token is used for performing the selected workflow (S405: Yes), the CPU 11 reads out a token associated with a service registered as the storage location 814 for the selected workflow, from the authentication information table 82 (S406).

Meanwhile, when determining that "Default" is not set as the use token 815 for the selected workflow, i.e., that a default token is not used but a specific token is used for performing the selected workflow (S405: No), the CPU 11 reads out a token associated with identification information of the selected workflow from the specific token table 83 (S407).

The CPU 11 determines whether the token read out in S406 or S407 is valid (S408). For instance, when storing a token onto the specific token table 83 in the aforementioned import process (see FIG. 7), the CPU 11 may store an expiration date and time of the token. In this case, the CPU 11 may make the determination in S408 based on an expiration date stored in association with the token. In this case, when the current date and time has passed the expiration date and time of the token read out in S406 or S407, the CPU 11 may determine that the read token is not valid (S408: No). In another instance, the CPU 11 may transmit to the cloud server a below-mentioned request for uploading of the obtained image data, and may make the determination in S408 based on whether the image data has been successfully uploaded. In this case, when the image data has been successfully uploaded, the CPU 11 may terminate the workflow execution process. Meanwhile, when the image data has not been successfully uploaded, the CPU 11 may determine that the read token is not valid (S408: No) and go to S409.

When determining that the read token is not valid (S408: No), the CPU 11 performs re-authentication (S409). For instance, the CPU 11 may cause the user I/F 15 to display a login screen for the designated service via the browser 42, thereby prompting the user to perform necessary operations for re-authentication. In another instance, the CPU 11 may inquire of the user whether to perform re-authentication. Further, the CPU 11 determines whether the CPU 11 has obtained a token from the service via successful re-authentication (S410).

When determining that the CPU 11 has not obtained a token from the service via successful re-authentication (e.g., when having failed in the re-authentication or having received an instruction not to perform re-authentication) (S410: No), the CPU 11 provides an error notification that the CPU 11 has failed to perform the workflow (S411). Thereafter, the CPU 11 terminates the workflow execution process. It is noted that, in this case, the CPU 11 deletes the image data obtained in S402 before terminating the workflow execution process.

When determining that the CPU 11 has obtained a token from the service via successful re-authentication (S410: Yes), the CPU 11 stores the obtained token by replacing the invalid token read out in S406 or S407 with the obtained token (S412). Thus, when the token read out of the authentication information table 82 in S406 has expired, the CPU 11 updates the token stored on the authentication information table 82. Further, when the token read out of the specific token table 83 in S407 has expired, the CPU 11 updates the token stored on the specific token table 83.

Further, the CPU 11 determines whether the expired token is the same as a specific token for another workflow (S413). Specifically, the CPU 11 determines whether the same token as the expired token is stored in association with identification information of another workflow stored on the specific token table 83. When determining that the expired token is the same as a specific token for another workflow (S413: Yes), the CPU 11 replaces the same token as the expired token on the specific token table 83 with the token obtained via successful re-authentication (S414).

When determining that the read token is valid (S408: Yes) or that the expired token is not the same as a specific token for another workflow (S413: No), or after S414, the CPU 11 uploads the image data obtained in S402 to the service by using the corresponding token (S415). Afterward, the CPU 11 terminates the workflow execution process.

Figure 12:
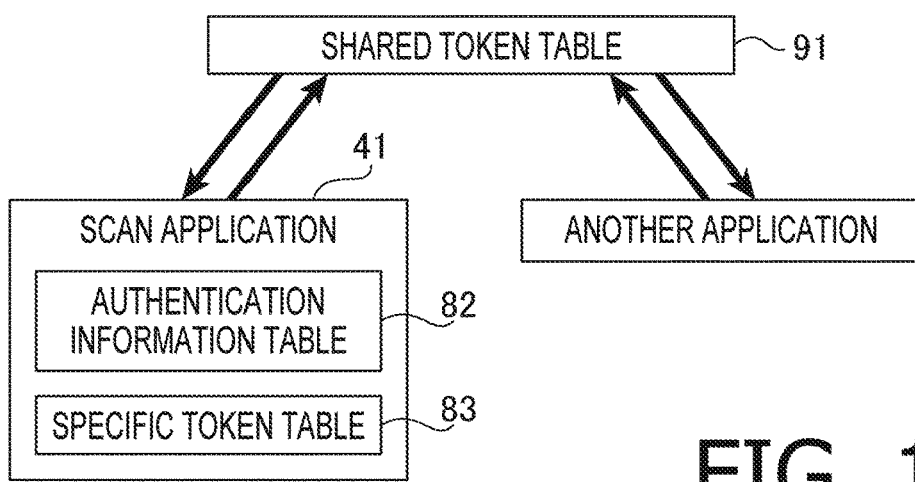
FIG. 12 shows an example of a configuration in which tokens are shared by both a scan application and another application that are incorporated in the PC, in a modification according to one or more aspects of the present disclosure.

The PC 1 may have another application for using the services provided by the cloud servers, besides the scan application 41. In this case, the scan application 41 and the said another application may share the tokens with each other. For instance, as shown in FIG. 12, the PC 1 may have a shared token table 91 in a particular area referable from both the scan application 41 and the said another application, separately from the authentication information table 82 and the specific token table 83 managed by the scan application 41. In this case, the shared token table 91 may store thereon information on each shared token in association with identification information of a corresponding service. The shared token table 91 may be an example of a "third table" according to aspects of the present disclosure.

In this case, for instance, when making the negative determination in S303 or S306 of the token determination process (S303: No, or S306: No), if the shared token table 91 stores information on a token associated with identification information of a service used for an import-target workflow, the CPU 11 executing the scan application 41 may obtain the information on the token from the shared token table 91 and use the token as a specific token for the import-target workflow.

It is noted that the scan application 41 may have the shared token table 91 instead of the authentication information table 82. In this case, each default token may be registered on the shared token table 91.

As described above, according to the scan application 41 of the illustrative embodiment, when importing information on an import-target workflow, the PC 1 selects an authentication style representing a method for obtaining a token for the import-target workflow, and uses the token obtained in the selected authentication style to access a corresponding cloud server. Thereby, the user may selectively use different tokens for accessing a corresponding cloud server. Thus, it is possible to improve user-friendliness of the PC 1.

In the illustrative embodiment, for instance, when importing information on an import-target workflow, the scan application 41 may select the method in which the scan application 41 obtains a token registered on the authentication information table 82. Further, when the above method is not selected, the scan application 41 may obtain a token from a source other than the authentication information table 82 and register the obtained token in association with the import-target workflow onto the specific token table 83. In an attempt to access a corresponding cloud server to perform a target workflow, when the use of a default token is selected, the scan application 41 may use an associated token read out from the authentication information table 82. Meanwhile, when the use of a default token is not selected, the scan application 41 may use an associated token read out from the specific token table 83 and uses the read token. Thereby, the user may selectively use different tokens depending on whether the user wishes to access the cloud server by using a specific account or a shared account. Thus, it is possible to omit user operations for authentication in the attempt to access the corresponding cloud server to perform the target workflow and also possible to access the corresponding cloud server by using an appropriate account depending on the user's selection.

Further, in the illustrative embodiment, when the use of a token registered on the authentication information table 82 is not selected, the scan application 41 may read out and obtain a token for using the same cloud server from the specific token table 83. Since a same account is highly likely to be used to access the same cloud server, it is possible to obtain the desired token with no need to actually access the cloud server, by reading out the same token from the specific token table 83. Further, nonetheless, the scan application 41 may actually access the cloud server to certainly obtain the desired token. Further, when the shared token table 91 is available, the scan application 41 may obtain a token shared by another application.

Further, in the illustrative embodiment, the scan application 41 may incorporate a token into an export file, and may select the method in which the scan application 41 obtains the token included in the export file, when importing the workflow from the export file. For instance, when a user, who has exported a workflow and generated an export file with a token incorporated therein on the PC 1, allows another user to use the same workflow on another PC, the said another user is allowed to obtain the same token only by importing the workflow from the export file. Hence, it is possible for a plurality of users to easily use the same workflow. Further, since there is no need to disclose information on the account to the public, it is possible to reduce the number of occasions to actually access the cloud server and perform the authentication procedure.

Further, in the illustrative embodiment, the scan application 41 may incorporate information on an authentication style into an export file when exporting a workflow, and may obtain a token in accordance with the authentication style included in the export file when importing the workflow from the export file. Thus, when generating the export file, a user may select the authentication style representing a method for obtaining the token for the workflow to be imported. Further, the scan application 41 may incorporate the unchangeable-style information into the export file. Thereby, the authentication style selected by the user who has generated the export file is prioritized. Meanwhile, when the unchangeable-style information is not included in the export file, an authentication style selected by a user who has imported the workflow from the export file is prioritized.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

For instance, an image processing apparatus connected with the PC 1 is not limited to an apparatus (e.g., the image scanner 2) to obtain image data, but may be an apparatus (e.g., a printer) to perform printing based on image data. Namely, aspects of the present disclosure may be applied not only to a workflow storing a sequence of processes including scanning an image and storing image data of the scanned image, but also to a workflow storing a sequence of processes including downloading image data from a cloud server and printing an image based on the downloaded image data.

Further, for instance, regardless of whether the unchangeable-style information is included in the export file, the scan application 41 may not receive a selection from the selectable authentication styles (i.e., may not perform S203 or S204), and may determine a token based on information set in the export file. Further, the selectable authentication styles may include a wider variety of authentication styles than exemplified in the aforementioned illustrative embodiment, or may include a narrower variety of authentication styles than exemplified in the aforementioned illustrative embodiment. Further, for instance, the unchangeable-style screen 53, which is displayed when the export file includes the unchangeable-style information, may not be displayed.

Further, for instance, the workflow table 81 may not include the field of the use token 815. In this case, in the workflow execution process, the CPU 11 may search the specific token table 83, instead of performing 5405. Further, in this case, when determining that identification information associated with the selected workflow is stored on the specific token table 83, the CPU 11 may go to 5407. Meanwhile, when determining that identification information associated with the selected workflow is not stored on the specific token table 83, the CPU 11 may go to 5406.

In the aforementioned illustrative embodiment, even though receiving a user's selection of using the same account as used for another workflow (S303: Yes), when a workflow using the same service as used for the import-target workflow is not stored on the workflow table 81, or a token associated with the selected workflow is not stored on the specific token table 83, the CPU 11 determines whether to use the default token. Nonetheless, in such a case, the CPU 11 may determine that an error has occurred, and may go back to S301 to receive a user's re-selection. Further, in the aforementioned illustrative embodiment, even though receiving a user's selection of using a new account (S302: Yes), when having failed to obtain a token, the CPU 11 determines whether to use the default token. Nonetheless, in such a case, the CPU 11 may determine that an error has occurred, and may go back to S301 to receive a user's re-selection.

In the aforementioned illustrative embodiment, when making the negative determination in S311 (S311: No) or in S312 (S312: No) of the token determination process, the CPU 11 cancels import of the import-target workflow. Nonetheless, in such a case, the CPU 11 may import the import-target workflow without determining how to obtain a token. For instance, the CPU 11 may generate a workflow having "Specific" as the use token 815. In this case, in S407 of the workflow execution process, the CPU 11 fails to read out a token associated with identification information of the selected workflow from the specific token table 83. Hence, the CPU 11 may make the negative determination in S408 (S408: No) and go to S409 to perform re-authentication.

Further, for instance, in the token determination process, when determining in S309 that the CPU 11 has obtained a token for a new account from the cloud server (S309: Yes), and a default token for the corresponding service is not stored on the authentication information table 82, the CPU 11 may store the obtained token as a default token onto the authentication information table 82. Further, the CPU 11 may inquire of the user whether to register the obtained token as a default token.

Further, in the workflow execution process, the CPU 11 may perform image scanning after determining how to store image data of the scanned image. Specifically, the CPU 11 may perform image scanning immediately before S404 or S415.

Further, for instance, the scan application 41 may not have a plurality of cloud servers as selectable upload destinations. Namely, the scan application 41 may have a single cloud server as a fixed upload destination to which image data is uploaded via the scan application 41. Further, for instance, the authentication information table 82 may be configured to store each token in association not only with information on a corresponding service but also with user information.

Further, for instance, after reading out a token stored on the workflow table 81 or the authentication information table 82, the CPU 11 may check whether the read token is valid. In this case, for instance, the CPU 11 may inquire of the cloud server whether the read token is valid. In another instance, the CPU 11 may store, onto the workflow table 81 and/or the authentication information table 82, each token in association with information regarding an expiration date and time and/or the number of times that each token is usable as a valid token. In this case, the CPU 11 may determine whether the read token is valid, with reference to the workflow table 81 or the authentication information table 82.

Further, in each of the flowcharts exemplified in the aforementioned illustrative embodiment, some of the steps may be performed in a different execution sequence or in parallel within a scope consistent with the processing concept of each flowchart as expressed in the present disclosure.

Further, each of the processes exemplified in the aforementioned illustrative embodiment may be performed solely or in combination by at least one of hardware elements such as CPUs and ASICs. In addition, each process exemplified in the aforementioned illustrative embodiment may be practiced in various aspects, e.g., in computer software as a program storable on a computer-readable medium, or in a method implementable on a computer.

The following shows examples of associations between elements exemplified in the aforementioned illustrative embodiment and modifications and elements according to aspects of the present disclosure. The PC 1 may be an example of an "information processing device" according to aspects of the present disclosure. The image scanner 2 may be an example of an "image processing apparatus" according to aspects of the present disclosure. The CPU 11 may be an example of a "processor" according to aspects of the present disclosure. Examples of a "memory" according to aspects of the present disclosure may include, but are not limited to, a buffer of the CPU 11, the ROM 12, the RAM 13, and the non-volatile memory 14. The scan application 41 may be an example of an "application" according to aspects of the present disclosure. Further, the scan application 41 may be an example of "processor-executable instructions" according to aspects of the present disclosure. The user I/F 15 may be an example of a "display" according to aspects of the present disclosure. The network I/F 16 and the USB I/F 17 may be included in "one or more communication interfaces" according to aspects of the present disclosure. The controller 10 may be an example of a "controller" according to aspects of the present disclosure. The token(s) may be an example of "authentication information" according to aspects of the present disclosure. The authentication information table 82 may be an example of a "first table" according to aspects of the present disclosure. The specific token table 83 may be an example of a "second table" according to aspects of the present disclosure. The shared token table 91 may be an example of a "third table" according to aspects of the present disclosure. The authentication style information may be an example of "particular information" according to aspects of the present disclosure. The unchangeable-style information may be an example of "method-changeability information" according to aspects of the present disclosure.

What is claimed is:

1. A non-transitory computer-readable medium storing computer-readable instructions executable by a processor of an information processing device communicably connected with an image processing apparatus and a cloud server, the computer-readable instructions realizing an application configured to, when executed by the processor, cause the processor to:
  in response to receiving an import instruction to import a workflow, perform:
    reading, from an export file, workflow information representing the workflow that is a sequence of processes using the image processing apparatus and the cloud server; and
    selecting one of a plurality of methods to obtain authentication information for accessing the cloud server to perform the workflow represented by the read workflow information; and
  in response to receiving a workflow execution instruction to perform the workflow, access the cloud server by using the authentication information obtained in the selected method;
  the plurality of methods including at least three different methods comprising:

a first method to obtain the authentication information stored in a memory of the information processing device in association with identification information of the cloud server;
a second method to obtain the authentication information stored in the memory of the information processing device in association with identification information of the workflow to be imported; and
a third method to obtain the authentication information newly from the cloud server.

2. The non-transitory computer-readable medium according to claim 1,
wherein the plurality of methods include the first method in which the authentication information is obtained from a first table stored in the memory of the information processing device, the first table storing the authentication information in association with identification information of the cloud server, and
wherein the application is further configured to, when executed by the processor, cause the processor to:
when the first method is not selected, obtain the authentication information from a source other than the first table, and register the obtained authentication information onto a second table in association with identification information of the workflow to be imported; and
in response to receiving the workflow execution instruction, perform:
when the first method is selected, reading out the authentication information associated with the identification information of the cloud server set for the workflow to be imported, from the first table, and accessing the cloud server by using the authentication information read out from the first table; and
when the first method is not selected, reading out the authentication information associated with the identification information of the workflow from the second table, and accessing the cloud server by using the authentication information read out from the second table.

3. The non-transitory computer-readable medium according to claim 1,
wherein the plurality of methods include the first method in which the authentication information is obtained from a first table stored in the memory of the information processing device, the first table storing the authentication information in association with identification information of the cloud server, and
wherein the application is further configured to, when executed by the processor, cause the processor to:
when the first method is selected, perform:
reading out the authentication information associated with the identification information of the cloud server from the first table, and registering the read authentication information onto a second table in association with the identification information of the workflow to be imported; and
in response to receiving the workflow execution instruction, reading out the authentication information associated with the identification information of the workflow from the second table, and accessing the cloud server by using the authentication information read out from the second table.

4. The non-transitory computer-readable medium according to claim 2,
wherein the second table is configured to store a plurality of workflows registered thereon,
wherein the plurality of methods include the second method in which the authentication information is obtained from the second table, and
wherein the application is further configured to, when executed by the processor, cause the processor to:
when the second method is selected, if the second table stores identification information of another workflow using the same cloud server as set for the workflow to be imported, obtain authentication information associated with the said another workflow from the second table, and register the identification information of the workflow to be imported, onto the second table in association with the obtained authentication information.

5. The non-transitory computer-readable medium according to claim 2,
wherein the plurality of methods include the third method in which the authentication information is newly obtained from the cloud server, and
wherein the application is further configured to, when executed by the processor, cause the processor to:
when the third method is selected, receive information necessary for accessing the cloud server set for the workflow to be imported, access the cloud server by using the received information, obtain the authentication information newly from the cloud server, and register the identification information of the workflow to be imported, onto the second table in association with the newly obtained authentication information.

6. The non-transitory computer-readable medium according to claim 2,
wherein the information processing device has another application incorporated therein, the said another application being configured to, when executed by the processor, cause the processor to obtain the authentication information associated with the identification information of the cloud server from a third table stored in the memory of the information processing device, and access the cloud server by using the obtained authentication information,
wherein the plurality of methods include a fourth method in which the authentication information is obtained from the third table, and
wherein the application is further configured to, when executed by the processor, cause the processor to:
when the fourth method is selected, obtain the authentication information associated with the identification information of the same cloud server as set for the workflow to be imported, from the third table, and register the identification information of the workflow to be imported, onto the second table in association with the obtained authentication information.

7. The non-transitory computer-readable medium according to claim 2,
wherein the export file is configured to accept incorporation of the authentication information thereinto,
wherein the plurality of methods include a fourth method in which the authentication information is obtained from the export file, and
wherein the application is further configured to, when executed by the processor, cause the processor to:
when the fourth method is selected, obtain the authentication information from the export file, and register the identification information of the workflow to be imported, onto the second table in association with the obtained authentication information.

8. The non-transitory computer-readable medium according to claim 7,
wherein the application is further configured to, when executed by the processor, cause the processor to:
when the export file includes the authentication information, select the fourth method from among the plurality of methods.

9. The non-transitory computer-readable medium according to claim 1,
wherein the export file is configured to accept incorporation of particular information thereinto, the particular information specifying one of the plurality of methods, and
wherein the application is further configured to, when executed by the processor, cause the processor to:
when the export file includes the particular information, select the method specified by the particular information.

10. The non-transitory computer-readable medium according to claim 9,
wherein the export file includes method-changeability information representing whether a method other than the method specified by the particular information is selectable from among the plurality of methods, and
wherein the application is further configured to, when executed by the processor, cause the processor to:
when the method-changeability information included in the export file represents that a method other than the method specified by the particular information is selectable from among the plurality of methods, control a display of the information processing device to display a selection screen for receiving a selection from the plurality of methods, and receive the selection via the selection screen.

11. The non-transitory computer-readable medium according to claim 10,
wherein the selection screen is configured to be displayed in an initial state where the method specified by the particular information is selected as a default method.

12. The non-transitory computer-readable medium according to claim 9,
wherein the application is further configured to, when executed by the processor, cause the processor to:
in response to receiving an export instruction to export the workflow, receive a selection from the plurality of methods, and generate the export file by incorporating thereinto the particular information specifying the selected one of the plurality of methods.

13. An information processing device comprising:
one or more communication interfaces configured to communicate with an image processing apparatus and a cloud server; and
a controller configured to:
in response to receiving an import instruction to import a workflow, perform:
reading, from an export file, workflow information representing the workflow that is a sequence of processes using the image processing apparatus and the cloud server; and
selecting one of a plurality of methods to obtain authentication information for accessing the cloud server to perform the workflow represented by the read workflow information; and
in response to receiving a workflow execution instruction to perform the workflow, access the cloud server by using the authentication information obtained in the selected method;
the plurality of methods including at least three different methods comprising:
a first method to obtain the authentication information stored in a memory of the information processing device in association with identification information of the cloud server;
a second method to obtain the authentication information stored in the memory of the information processing device in association with identification information of the workflow to be imported; and
a third method to obtain the authentication information newly from the cloud server.

14. The information processing device according to claim 13,
wherein the controller comprises:
a processor; and
a memory storing processor-executable instructions configured to, when executed by the processor, cause the processor to:
in response to receiving the import instruction, read the workflow information from the export file, and select one of the plurality of methods; and
in response to receiving the workflow execution instruction, access the cloud server by using the authentication information obtained in the selected method.

15. A method implementable on a processor of an information processing device communicably connected with an image processing apparatus and a cloud server, the method comprising:
in response to receiving an import instruction to import a workflow, performing:
reading, from an export file, workflow information representing the workflow that is a sequence of processes using the image processing apparatus and the cloud server; and
selecting one of a plurality of methods to obtain authentication information for accessing the cloud server to perform the workflow represented by the read workflow information; and
in response to receiving a workflow execution instruction to perform the workflow, accessing the cloud server by using the authentication information obtained in the selected method;
the plurality of methods including at least three different methods comprising:
a first method to obtain the authentication information stored in a memory of the information processing device in association with identification information of the cloud server;
a second method to obtain the authentication information stored in the memory of the information processing device in association with identification information of the workflow to be imported; and
a third method to obtain the authentication information newly from the cloud server.

* * * * *